(12) United States Patent
Kuwano et al.

(10) Patent No.: US 11,489,403 B2
(45) Date of Patent: Nov. 1, 2022

(54) MOTOR

(71) Applicant: MABUCHI MOTOR CO., LTD., Chiba (JP)

(72) Inventors: Kunihiro Kuwano, Kawasaki (JP); Takashi Muramoto, Kamagaya (JP)

(73) Assignee: MABUCHI MOTOR CO., LTD., Matsudo (JP)

( * ) Notice: Subject to any disclaimer, the term of this patent is extended or adjusted under 35 U.S.C. 154(b) by 218 days.

(21) Appl. No.: 16/810,218

(22) Filed: Mar. 5, 2020

(65) Prior Publication Data
US 2020/0295621 A1  Sep. 17, 2020

(30) Foreign Application Priority Data
Mar. 11, 2019 (JP) .............................. JP2019-044244

(51) Int. Cl.
*H02K 5/24* (2006.01)
*H02K 5/14* (2006.01)
*H02K 15/14* (2006.01)
*F16F 15/12* (2006.01)

(52) U.S. Cl.
CPC .................. *H02K 5/24* (2013.01); *H02K 5/14* (2013.01); *H02K 15/14* (2013.01); *F16F 15/12* (2013.01)

(58) Field of Classification Search
CPC ............ H02K 5/14; H02K 5/24; H02K 15/14; H02K 2213/03; H02K 5/00; H02K 5/04; H02K 7/00; F16F 15/12; F16F 1/376; F16F 15/08; F16F 2226/045; F16F 2230/36; F16F 15/00; F16F 15/02; F16F 15/10; F16F 15/1295; F16F 7/00; F16F 9/00

USPC .............................................. 310/51, 89, 91
See application file for complete search history.

(56) References Cited

U.S. PATENT DOCUMENTS

| | | | |
|---|---|---|---|
| 2002/0050759 A1 | 5/2002 | Shiraki et al. | |
| 2005/0200062 A1* | 9/2005 | Maurer | F16F 7/12 267/144 |
| 2014/0328670 A1* | 11/2014 | Lamb | F04D 25/06 415/119 |
| 2015/0266441 A1* | 9/2015 | Tamada | B60R 21/04 296/187.05 |
| 2020/0080617 A1* | 3/2020 | Thawani | F04C 15/0065 |
| 2020/0083778 A1* | 3/2020 | Pack | H02K 5/02 |

FOREIGN PATENT DOCUMENTS

| | | |
|---|---|---|
| CN | 207612328 U | 7/2018 |
| JP | H02-53523 U | 4/1990 |

(Continued)

OTHER PUBLICATIONS

First Office Action issued by the China National Intellectual Property Administration for corresponding Chinese Patent Application No. 202010159811.1, dated Feb. 8, 2022, with a full English translation.

(Continued)

*Primary Examiner* — Alexander A Singh
(74) *Attorney, Agent, or Firm* — Myers Wolin, LLC

(57) ABSTRACT

A motor includes a case; and a partition that is fitted into the case and has an easily deformable part formed on an outer peripheral surface for dispersing and dissipating vibration transmitted between the case and the partition. A space is formed in the easily deformable part.

13 Claims, 5 Drawing Sheets

(56) References Cited

FOREIGN PATENT DOCUMENTS

JP  3706301 B2  10/2005
JP  3193708 U   10/2014

OTHER PUBLICATIONS

Second Office Action with Search Report issued by the China National Intellectual Property Administration for corresponding Chinese Patent Application No. 202010159811.1, dated Aug. 9, 2022, with an English translation.
Notice of Reasons for Refusal issued by the Japan Patent Office for corresponding Japanese Patent Application No. 2019-044244, dated Aug. 23, 2022, with an English translation.

* cited by examiner

MOTOR

CROSS-REFERENCE TO THE RELATED APPLICATION

This application claims priority to Japanese Patent Application No. 2019-044244, filed Mar. 11, 2019, the entire contents of which is incorporated herein by reference.

BACKGROUND

Technical Field

The present disclosure relates to a motor.

Related Art

Typically, a motor that includes a casing having a stator attached to the inner peripheral surface and a rotor disposed inside the casing is known (for example, refer to JP 3706301 A).

The casing is formed in a bottomed hollow tubular shape, and includes a housing (case) having a rotor disposed inside and a brush holder (partition) fitted to the opening of the housing. A plurality of third protrusions is formed on the outer peripheral surface of the brush holder. When the brush holder is engaged with the housing, the plurality of third protrusions of the brush holder is pressed against the inner peripheral surface of the housing.

When the rotor rotates, the brush holder vibrates. The vibration of the brush holder is securely transmitted to the housing having a large mass, and vibration of the brush holder is damped in the housing.

SUMMARY

However, the method of damping motor vibration described in JP 3706301 A can be improved.

The present disclosure has been made in light of the above circumstances, and aims to provide a motor capable of effectively damping vibration transmitted between the case and the partition.

In order to address the above issues, the present disclosure proposes the method below.

The motor according to an embodiment of the present disclosure includes a case; and a partition that is fitted into the case and has an easily deformable part formed on an outer peripheral surface for dispersing and dissipating vibration transmitted between the case and the partition. A space is formed in the easily deformable part. According to an embodiment of the present disclosure, vibration transmitted from one side of the case and the partition toward the other side is transmitted to the easily deformable part. Since a space is formed in the easily deformable part, the easily deformable part is easily deformed toward the space or the like by the transmitted vibration as compared with the case where the space is not formed in the easily deformable part. This is because, due to the effect of the geometrical moment of inertia in the cross section in the axial direction or the cross section in the radial direction of the partition, the appearance hardness of the easily deformable part is reduced by the cross section amount of the space, increasing the displacement amount of the easily deformable part and decreasing the stress necessary for deforming the deformation easily deformable part to a fixed displacement amount.

The vibration transmitted to the easily deformable part is effectively dispersed and dissipated by the easily deformable part, and is damped. Therefore, the vibration transmitted from one side of the case and the partition to the other side can be effectively damped regardless of whether the vibration has been transmitted from either the case or the partition.

In the above motor, the easily deformable part may have a plurality of support pieces protruding from the outer peripheral surface of the partition toward the outside of the case in the radial direction, and the plurality of support pieces may be disposed alternately with the space in the circumferential direction of the case.

According to an embodiment of the present disclosure, for example, even if the plurality of support pieces is formed of a relatively hard material (having a large longitudinal elastic modulus), the plurality of support pieces comes into contact with only a part of the entire inner peripheral surface of the case in the circumferential direction. Therefore, a force acting between the case and the plurality of support pieces is concentrated on the outer peripheral surface of the plurality of support pieces. The plurality of support pieces is easily deformed in the radial direction and the circumferential direction compared with the case where the plurality of support pieces comes into contact with the entire inner peripheral surface of the case. Accordingly, the insertion force necessary for inserting the partition into the case can be reduced.

In addition, in the above motor, when the length in the circumferential direction in which each of the support pieces comes into contact with the inner peripheral surface of the case is the contact length, and when the length in the circumferential direction between the plurality of support pieces adjacent in the circumferential direction along the inner peripheral surface of the case is the non-contact length, the value obtained by dividing the contact length by the sum of the contact length and the non-contact length may be 0.4 to 0.6.

In addition, in the above motor, the ratio of the length in the circumferential direction between the plurality of support pieces adjacent in the circumferential direction along the inner peripheral surface of the case with respect to the distance in the radial direction from the inner peripheral surface of the case to the bottom of the space may be 1 to 2.

In addition, in the above motor, the total ratio of the length in the circumferential direction in which each support piece comes into contact with the inner peripheral surface of the case with respect to the full length in the circumferential direction of the inner peripheral surface of the case may be 0.1 to 0.6.

In addition, in the above motor, when viewed in a direction along the center axis of the case, the length in the circumferential direction in which each support piece comes into contact with the inner peripheral surface of the case may be 1 to 50 times the actual amplitude in the natural frequency of the case.

Here, the actual amplitude means the amplitude obtained by actually measuring the vibration of the motor vibrating at the natural frequency of the case. Specifically, the actual amplitude means the amplitude calculated by assuming sine wave oscillation from the measured values of the frequency and acceleration of the motor measured by a mechanical vibration measuring machine, a laser Doppler vibration measuring machine, and the like.

In addition, in the above motor, the ratio of the full length in the circumferential direction of the case in which the easily deformable part is disposed with respect to the total length in the circumferential direction of the inner peripheral surface of the case may be 0.25 or more.

In addition, in the above motor, the easily deformable part may include a dispersion dissipation damping part that disperses the vibration and dissipates the dispersed vibration, and a material damping part that dissipates the vibration due to friction between molecules when the easily deformable part is deformed.

The motor according to an embodiment of the present disclosure can effectively damp vibration transmitted between the case and the partition.

DETAILED DESCRIPTION

An embodiment of a motor according to the present disclosure will be described below with reference to FIG. 1 to FIG. 6 using an example of the case where the motor is a motor with a brush.

Figure 1:
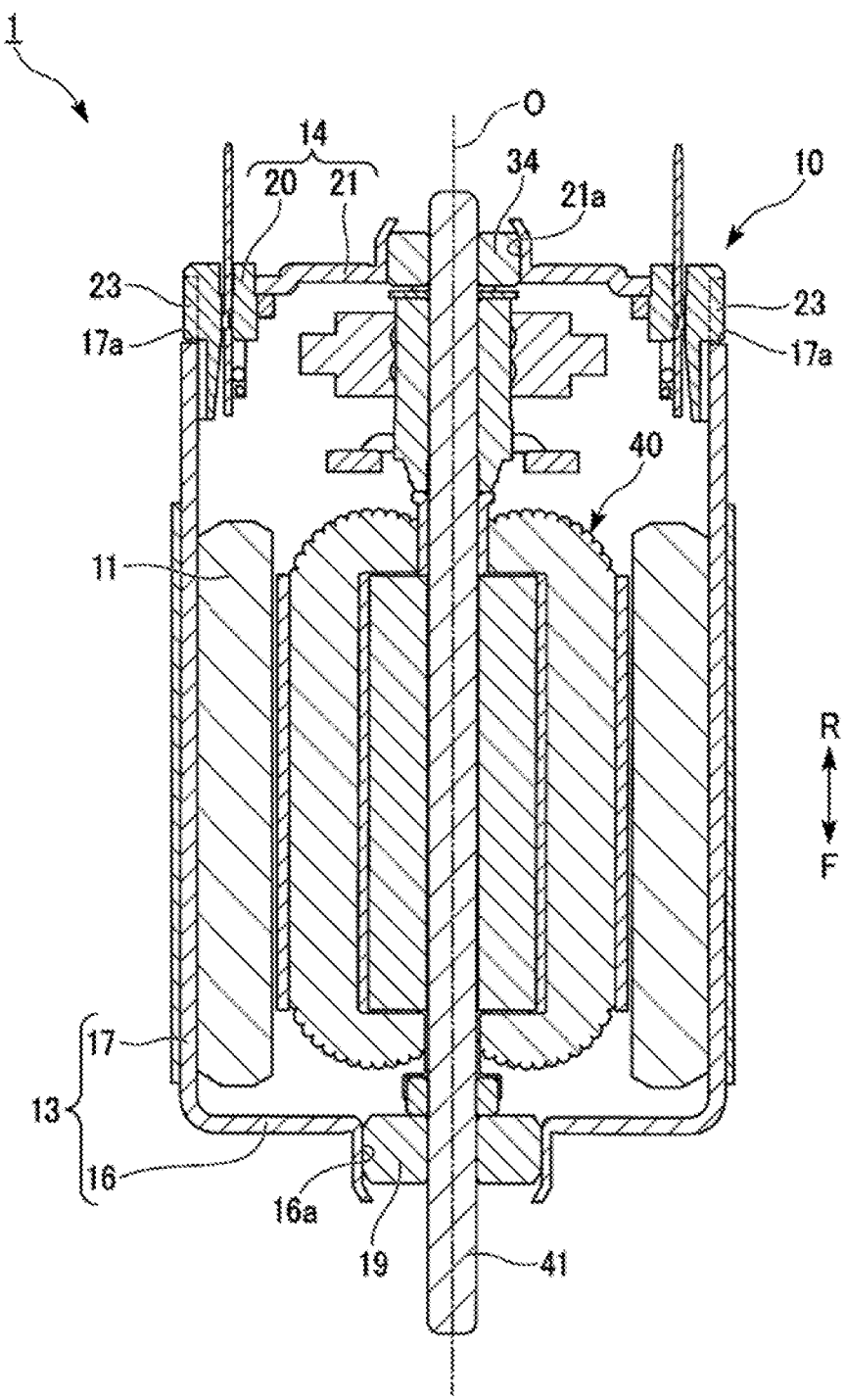
FIG. 1 is a longitudinal cross-sectional view of a motor according to an embodiment of the present disclosure.

As shown in FIG. 1, a motor 1 of the present embodiment includes a casing 10 having a stator 11 attached to the inner peripheral surface, and a rotor 40 rotatably supported around a center axis O of a rotation shaft 41 inside the casing 10.

As the stator 11 and the rotor 40, a well-known configuration can be adopted. In the following description, the direction along the center axis O is referred to as the axial direction. In addition, the direction orthogonal to the axial direction is referred to as the radial direction, and the direction around the rotation shaft 41 is referred to as the circumferential direction.

The casing 10 includes a case 13 formed in a bottomed tubular shape (a tubular shape in which the first end is closed), and a brush holder (partition) 14 fitted into the case 13. The radial direction and the circumferential direction are also the radial direction of the case 13 and the circumferential direction of the case 13.

The stator 11 is a permanent magnet or the like.

The case 13 is formed of a metal material such as aluminum. The brush holder 14 protrudes from the second end of the case 13 toward the outside in the axial direction.

In the following description, the side of the case 13 with respect to the protruding brush holder 14 along the axial direction is referred to as a front side F, and the side of the protruding brush holder 14 with respect to the case 13 is referred to as a rear side R. Expressions such as the front side F and the rear side R are for convenience of explanation of the structure of the motor 1, and do not limit the posture in the state where the motor 1 is used.

A through-hole 16a penetrating a bottom wall part 16 in the axial direction is formed in the bottom wall part 16 of the case 13. A bearing 19 is fixed to the opening peripheral edge part of the through-hole 16a in the bottom wall part 16. The rear end part (second end part) of a peripheral wall part 17 is opened in the axial direction.

Figure 2:
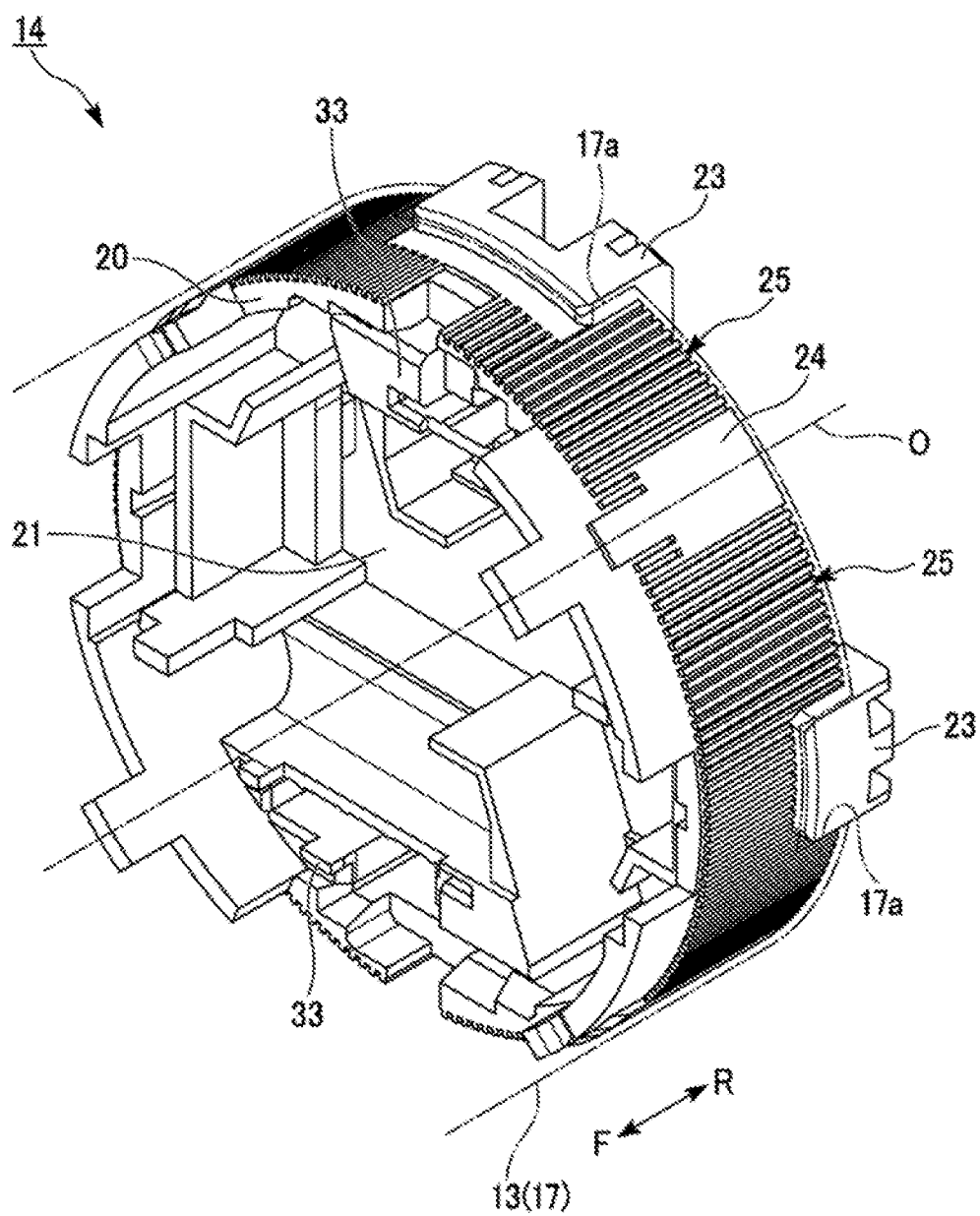
FIG. 2 is a perspective view of a brush holder of the motor.

The perspective view of the brush holder 14 is shown in FIG. 2. In FIG. 2, the peripheral wall part 17 of the case 13 is shown by two-dot chain lines.

As shown in FIG. 1 and FIG. 2, a notch 17a is formed at the rear end of the peripheral wall part 17 of the case 13. The plurality of notches 17a is formed in the circumferential direction of the peripheral wall part 17. The plurality of notches 17a is disposed having an interval with respect to each other in the circumferential direction.

The brush holder 14 is formed in a bottomed tubular shape.

As shown in FIG. 2, an engagement part 23, a flat part 24, and an easily deformable part 25 are formed on the outer peripheral surface of a peripheral wall part 20 of the brush holder 14.

The engagement part 23 protrudes from the outer peripheral surface of the peripheral wall part 20 toward the outside in the radial direction. The engagement part 23 is formed at the rear end part of the peripheral wall part 20, and protrudes toward the rear side R than the rear end of the peripheral wall part 20. The plurality of engagement parts 23 is formed on the outer peripheral surface of the peripheral wall part 20. The plurality of engaging parts 23 is disposed at positions corresponding to the plurality of notches 17a having an interval with respect to each other in the circumferential direction.

As shown in FIG. 1, the diameter of the circumscribed circle of the plurality of engaging parts 23 and the outer diameter of the peripheral wall part 17 of the case 13 are equal to each other.

As shown in FIG. 2, the flat part 24 is disposed between the plurality of engagement parts 23 adjacent to each other in the circumferential direction. The flat part 24 extends from the rear end of the peripheral wall part 20 to a part disposed on the front side F from the engagement part 23 on the outer peripheral surface of the peripheral wall part 20.

Figure 3:
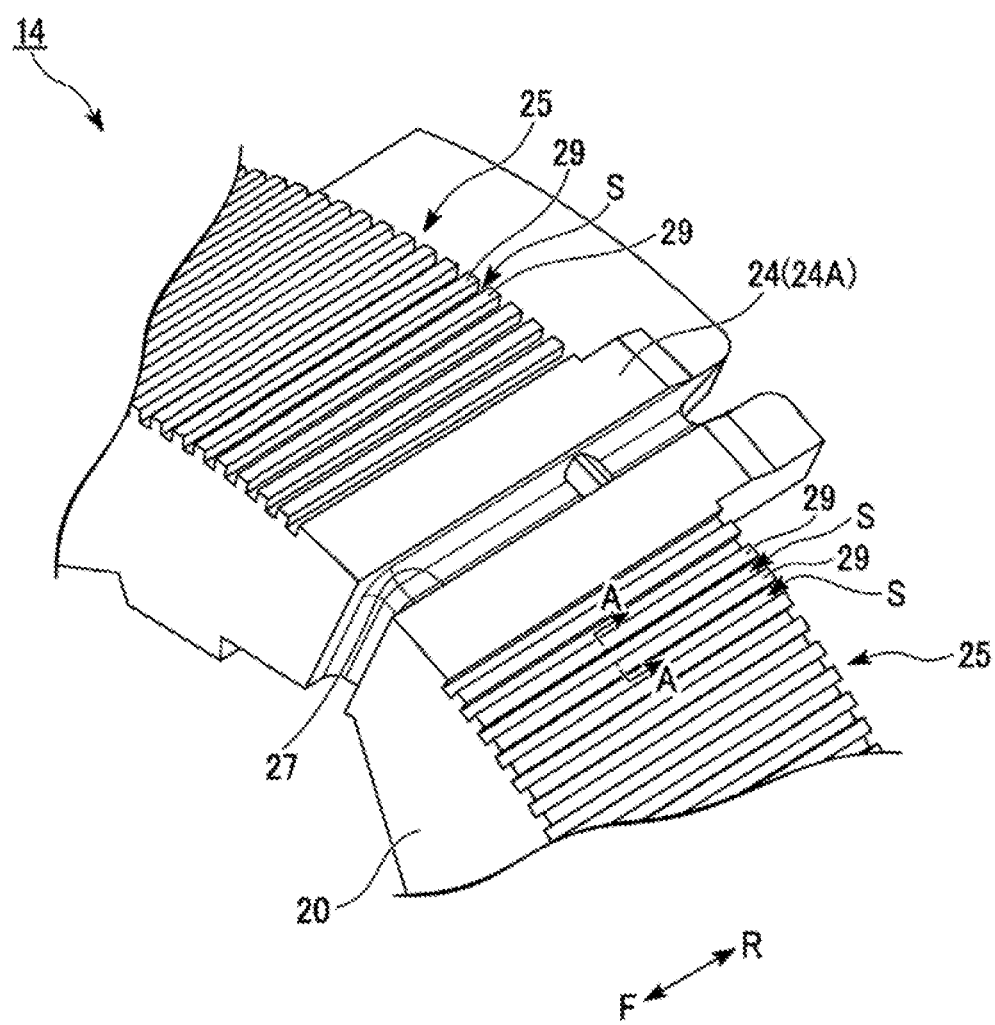
FIG. 3 is a perspective view of a main part of the brush holder viewed from a direction different from that of FIG. 2.

The plurality of flat parts 24 are formed on the outer peripheral surface of the peripheral wall part 20. As shown in FIG. 3, a groove 27 for passing a wiring that is not shown is formed on the outer peripheral surface of a flat part 24A, which is a part of the plurality of flat parts 24. The groove 27 penetrates the flat part 24A in the axial direction.

The diameter of the circumscribed circle of the plurality of flat parts 24 and the inner diameter of the peripheral wall part 17 of the case 13 are equal to each other.

Figure 4:
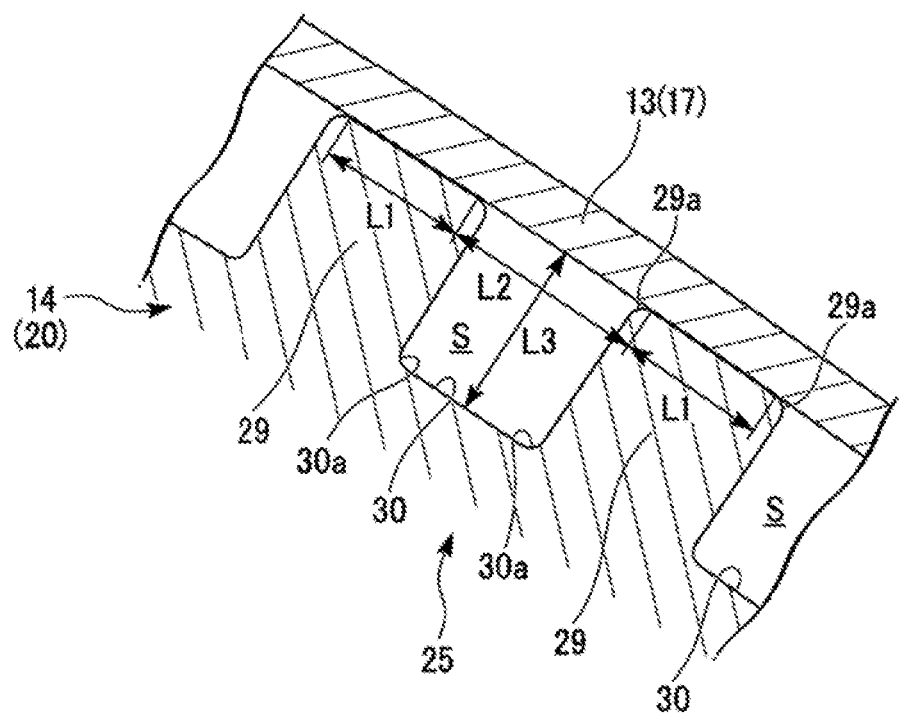
FIG. 4 is a cross-sectional view of a cutting line A-A in FIG. 3.

The easily deformable part 25 disperses and dissipates vibration transmitted between the brush holder 14 and the peripheral wall part 17 of the case 13. In the easily deformable part 25, deformation becomes easy compared with the case where no space is formed in the easily deformable part 25. As shown in FIG. 3 and FIG. 4, a space S is formed in the easily deformable part 25. FIG. 4 is a cross-sectional view taken along the center axis O of the case 13, and FIG. 4 also shows the peripheral wall part 17 of the case 13.

More specifically, the easily deformable part 25 includes a plurality of ribs (support pieces) 29 protruding from the outer peripheral surface of the peripheral wall part 20 toward the outside in the radial direction. The plurality of ribs 29 is disposed alternately with the space S in the circumferential direction. Each rib 29 extends in the axial direction.

As shown in FIG. 4, in this example, the cross-sectional shape orthogonal to the center axis O of each rib 29 has a rectangular shape equal to each other. A rectangular groove 30 is formed between the ribs 29 adjacent to each other in the circumferential direction. The cross-sectional shapes orthogonal to the center axis O of each groove 30 are equal to each other. The bottom surface of the groove 30 is flat. The bottom surface of the groove 30 may be curved to be convex toward the inner side in the radial direction. In this case, the groove 30 is a so-called semi-circular shape (semi-columnar shape). The bottom surface of the groove 30 may be a triangular shape convex toward the inner side in the radial direction.

The radius of the corner part 29a formed at both end parts in the circumferential direction on the outer peripheral surface of the rib 29 is preferably about 0.1 mm. The radius of the corner part 30a formed at both end parts in the circumferential direction at the bottom surface of the groove 30 is preferably about 0.1 mm to 0.2 mm.

As shown in FIG. 2, each rib 29 is formed within the range in which the flat part 24 is formed in the axial direction. As shown in FIG. 4, the outer peripheral surface of each rib 29 is in contact with the inner peripheral surface of the peripheral wall part 17 of the case 13.

The brush holder 14, the engagement part 23, the flat part 24, and the easily deformable part 25 are integrally formed by, for example, a synthetic resin material.

As shown in FIG. 1, the front end part of the brush holder 14 is disposed in the peripheral wall part 17 of the case 13. The engagement part 23 of the brush holder 14 is disposed in the notch 17a of the peripheral wall part 17, and is axially engaged with the opening peripheral edge part of the notch 17a in the peripheral wall part 17. The outer peripheral surface of the flat part 24 and the outer peripheral surfaces of the plurality of ribs 29 in the easily deformable part 25 are in contact with the inner peripheral surface of the peripheral wall part 17.

The brush holder 14 is fixed to the case 13 in the axial direction by a fixing member (not shown) such as a screw. The brush holder 14 is tightly fitted into the case 13.

In FIG. 4, the length of the rib 29 in the circumferential direction that is in contact with the inner peripheral surface of the peripheral wall part 17 of the case 13 is defined as contact length L1. The contact length L1 is length in which one rib 29 comes into contact with the inner peripheral surface of the peripheral wall part 17. The length in the circumferential direction between the ribs 29 adjacent to each other in the circumferential direction along the inner peripheral surface of the peripheral wall part 17 is defined as non-contact length L2. For example, each of the contact length L1 and the non-contact length L2 is 0.3 mm. The contact length L1 and the non-contact length L2 are preferably short.

The distance from the inner peripheral surface of the peripheral wall part 17 to the bottom of the space S (the bottom surface of the groove 30) in the radial direction is defined as L3. For example, the distance L3 is 0.3 mm.

The radius of a corner part 30a of the groove 30 may be the minimum value of the contact length L1, the non-contact length L2, and the distance L3.

The value obtained by dividing the contact length L1 by the sum of the contact length L1 and the non-contact length L2 is preferably 0.4 to 0.6.

The ratio of the non-contact length L2 to the distance L3 is preferably 1 to 2. The contact length L1 is preferably 1 to 50 times the actual amplitude in the natural frequency of the case 13. Here, the actual amplitude means the amplitude obtained by actually measuring the vibration of the motor 1 vibrating at the natural frequency of the case 13. Specifically, the actual amplitude means the amplitude calculated by assuming sine wave oscillation from the measured values of the frequency and acceleration of the motor 1 measured by a mechanical vibration measuring machine, a laser Doppler vibration measuring machine, and the like. In addition, in this example, the actual amplitude may be a predetermined value in the range of 5 μm (micrometers) to 25 μm.

As shown in FIG. 2, in this example, the plurality of easily deformable parts 25 is formed between the plurality of engagement parts 23 and the plurality of flat parts 24. It is preferable that the ratio of the total length in the circumferential direction in which the plurality of easily deformable parts 25 is disposed with respect to the total length in the circumferential direction of the inner peripheral surface of the peripheral wall part 17 is 0.25 or more.

The total ratio of the contact length L1 to the full length in the circumferential direction of the inner peripheral surface of the peripheral wall part 17 is preferably 0.1 to 0.6. When the ratio of the circumferential length in which the plurality of the easily deformable parts 25 to the full length of the inner peripheral surface of the peripheral wall part 17 is disposed is 0.25, and the value obtained by dividing the contact length L1 by the sum of the contact length L1 and the non-contact length L2 is 0.4, the ratio becomes 0.1 by the formula of (0.25×0.4). When the ratio of the circumferential length in which the plurality of the easily deformable parts 25 to the full length of the inner peripheral surface of the peripheral wall part 17 is disposed is 1.0, and the value obtained by dividing the contact length L1 by the sum of the contact length L1 and the non-contact length L2 is 0.6, the ratio becomes 0.6 by the formula of (1.0×0.6).

The easily deformable part 25 (the rib 29) includes a dispersion dissipation damping part (dispersion loss damping part) and a material damping part. The dispersion dissipation damping part is a function achieved by, for example, a mechanical structural element of resin. For example, the dispersion dissipation damping part disperses the vibration transmitted in the radial direction from the peripheral wall part 17 of the case 13 to the easily deformable part 25 to have a circumferential direction or an axial direction component, and further dissipates the dispersed vibration.

The material damping part is, for example, a function achieved by the physical element of resin. The material damping part converts the dispersed vibration into thermal energy by friction between molecules when the easily deformable part 25 is deformed to dissipate the thermal energy.

Vibration is dispersed and dissipated by the dispersion dissipation damping part of the easily deformable part 25, and the material damping part of the resin material on the transmission path of the dispersed vibration causes the vibration to be additionally dissipated. By the superposition effect of the dispersion dissipation damping part and the material damping part, the damping effect of vibration of the entire easily deformable part 25 becomes high. The Q value (sharpness) of the resonance of the case 13 can be reduced by the dispersion dissipation damping part and the material damping part of easily deformable part 25.

The plurality of easily deformable parts 25 configured as described above has no significant influence on the function of dispersing and dissipating vibration even the plurality of easily deformable parts 25 is eliminated by about 30%.

As shown in FIG. 2, a pair of holding parts 33 for holding a brush that is not shown is formed on a top wall part 21 of the brush holder 14. The pair of holding parts 33 is disposed to face each other across the center axis O.

As shown in FIG. 1, the through-hole 21a penetrating the top wall part 21 in the axial direction is formed on the top wall part 21 of the brush holder 14. A bearing 34 is fixed to the opening peripheral edge part of the through-hole 21a on the top wall part 21.

The rotation shaft 41 is rotatably supported on the center axis O by the bearing 19 of the case 13 and the bearing 34 of the brush holder 14.

The rotor 40 is a coil or the like. The rotor 40 is fixed to the outer peripheral surface of the rotation shaft 41. The rotor 40 is disposed to face the stator 11 in the radial direction.

In the motor 1 configured as described above, when electric power is supplied to the rotor 40 through a brush, the rotor 40 rotates around the center axis O by a magnetic force acting between the rotor 40 and the stator 11. Vibration generated by the rotation of the rotor 40 is transmitted to the case 13, for example, and the transmitted vibration is further transmitted to the plurality of ribs 29 of the easily deformable part 25. Vibration transmitted to the easily deformable part 25 is damped by the dispersion dissipation damping part and the material damping part of the easily deformable part 25.

As described above, according to the motor 1 of the present embodiment, vibration transmitted from the case 13 to the brush holder 14 is transmitted to the easily deformable part 25. Since the space S is formed in the easily deformable part 25, the easily deformable part 25 is easily deformed toward the space S or the like by the transmitted vibration as compared with the case where the space S is not formed in the easily deformable part 25. This is because, due to the effect of the geometrical moment of inertia in the cross section in the axial direction or the cross section in the radial direction of the brush holder 14, the appearance hardness of the easily deformable part 25 is reduced by the cross section amount of the space S, increasing the displacement amount of the easily deformable part 25 and decreasing the stress necessary for deforming the deformation easily deformable part 25 to a fixed displacement amount. The vibration transmitted to the easily deformable part 25 is effectively dispersed and dissipated by the easily deformable part 25, and is damped.

Therefore, the vibration transmitted from one side of the case 13 and the brush holder 14 to the other side can be effectively damped regardless of whether the vibration has been transmitted from either the case 13 or the brush holder 14.

The plurality of ribs 29 protrudes from the outer peripheral surface of the brush holder 14 toward the outside in the radial direction, and are disposed alternately with the space S in the circumferential direction. Even if the plurality of ribs 29 is formed of a relatively hard material, the plurality of ribs 29 comes in contact with only a part of the entire inner peripheral surface of the case 13 in the circumferential direction. Therefore, a force acting between the case and the plurality of support pieces is concentrated on the outer peripheral surfaces of the plurality of ribs 29. The plurality of ribs 29 is easily deformed in the radial direction and the circumferential direction compared with the case where the plurality of ribs 29 comes into contact with the entire inner peripheral surface of the case. Accordingly, the insertion force necessary for inserting the brush holder 14 into the case 13 can be reduced.

Even when a plurality of ribs 29 is formed by injection molding, the mold can be easily removed from the plurality of ribs 29 by moving the mold in the axial direction with respect to the plurality of ribs 29 at the time of mold release.

The value obtained by dividing the contact length L1 by the sum of the contact length L1 and the non-contact length L2 is 0.4 to 0.6. Thus, vibration is suppressed from being reflected at the boundary surface between the case 13 and the brush holder 14, and vibration can be transmitted more reliably between the case 13 and the brush holder 14.

When the ratio of the non-contact length L2 to the distance L3 from the inner peripheral surface of the peripheral wall part 17 to the bottom of the space S is 1 to 2, the space S can be reliably formed in the brush holder 14.

The total ratio of the contact length L1 to the full length in the circumferential direction of the inner peripheral surface of the peripheral wall part 17 is 0.1 to 0.6. Therefore, the length of the outer peripheral surface of the plurality of ribs 29 in contact with the inner peripheral surface of the peripheral wall part 17 can be sufficiently secured, and the vibration from one side of the case 13 and the brush holder 14 to the other side can be more reliably transmitted.

The contact length L1 is 1 to 50 times the actual amplitude in the natural frequency of the case 13. When the contact length L1 is equal to or more than the actual amplitude and close to the actual amplitude to some extent, the transmitted vibration can be effectively damped.

The ratio of the full length in the circumferential direction in which the plurality of easily deformable parts 25 is disposed to the full length in the circumferential direction of the inner peripheral surface of the peripheral wall part 17 is 0.25 or more. Thus, the vibration from one side of the case 13 and the brush holder 14 to the other side can be more reliably transmitted.

When the brush holder 14 is inserted into the case 13, shavings of the brush holder 14 may be produced. Even in this case, because the shavings enter a groove 30 of the brush holder 14, it is possible to suppress the shavings from moving to another place in the motor 1 and to improve the appearance of the motor 1.

In the present embodiment, the brush holder 14 is tightly fitted into the case 13. When the brush holder 14 is loosely fitted to the case 13, whether or not the brush holder 14 and the case 13 come into contact with each other varies according to the dimensional accuracy and the like of the brush holder 14 and the case 13. Therefore, variation in the mechanical noise and the contact state becomes large, and the reproducibility of vibration is lowered. By fitting the brush holder 14 into the case 13, variation in the contact state between the brush holder 14 and the case 13 can be reduced.

An embodiment of the present disclosure has been described in detail with reference to the drawings; however, the specific configuration is not limited to the embodiment, and modifications, combinations, deletions, and the like of the configuration without departing from the scope of the present disclosure are also included.

For example, in the embodiment, the circumferential lengths of the plurality of ribs 29 may be different from each other, or the circumferential lengths of the plurality of spaces S may be different from each other.

The plurality of ribs 29 is provided to extend in the axial direction on the outer peripheral surface of the peripheral wall part 20. However, the shape of the plurality of ribs 29 is not limited to this, and the plurality of ribs 29 may be disposed on the outer peripheral surface of the peripheral wall part 20 alternately with a space in the axial direction and extend in the circumferential direction. The ribs may be disposed in a lattice shape on the outer peripheral surface of the peripheral wall part 20.

The easily deformable part may be porous or the like. In this case, a space is formed in the porous interior or the like.

The partition is the brush holder 14; however, the partition is not limited to this as long as it is fitted into the case 13 in the case 13.

The motor 1 is a motor with a brush; however, the motor configuration is not limited to this, and the motor may be a so-called brushless motor or the like having no brush.

Embodiment

In the following, an embodiment (and a comparative example) of the present disclosure will be described in more detail; however, the present disclosure is not limited to the following examples.

A plurality of motors with different specifications, such as sample prototype type No. 1 to sample prototype No. 3, was prepared. In the sample prototype type No. 1, a brush holder was formed of PA66 (nylon 66) resin, and no rib was provided on the brush holder. In the sample prototype type No. 2, a brush holder was formed of PBT (polybutylene terephthalate) resin, and no rib was provided on the brush holder. In the sample prototype type No. 3, a brush holder was formed of PBT resin, and a rib was provided on the brush holder. The longitudinal elastic modulus of the PBT resin is twice the longitudinal elastic modulus of the PA66 resin. That is, the brush holder and the rib of the sample prototype type No. 2 and No. 3 are formed of a material harder than the brush holder of the sample prototype type No. 1.

Sample prototype type No. 1 and No. 2 are comparative examples, and sample prototype type No. 3 is an embodiment.

A pickup was attached to the peripheral wall part of the case of each motor of the sample prototype type No. 1 to the sample prototype type No. 3, and amplitude and mechanical noise of the primary vibration of the rotor was measured. The primary vibration of the rotor was measured by FFT. The mechanical noise was measured by a microphone disposed at a position distant from the motor to the outside in the radial direction by 30 cm. The voltage applied to the motor is 14 V.

The amplitude of the primary vibration of the rotor in the motor of the sample prototype type No. 1 had a maximum value of 19 μm, a minimum value of 2.4 μm, and an average value of 11.3 μm. The mechanical noise in the motor of the sample prototype type No. 1 had a maximum value of 60 dB, a minimum value of 53.5 dB, and an average value of 57.3 dB.

The amplitude of the primary vibration of the rotor in the motor of the sample prototype type No. 3 had a maximum value of 22.7 a minimum value of 6.0 and an average value of 14.6 The mechanical noise of the rotor in the motor of the sample prototype type No. 3 had a maximum value of 62.5 dB, a minimum value of 50.0 dB, and an average value of 54.8 dB.

Among the plurality of motors of the sample prototype type No. 1 to the sample prototype type No. 3, motors of which the amplitude of primary vibration of the rotor becomes substantially constant at a predetermined value were selected, and mechanical noise of the selected motors was compared.

Figure 5:
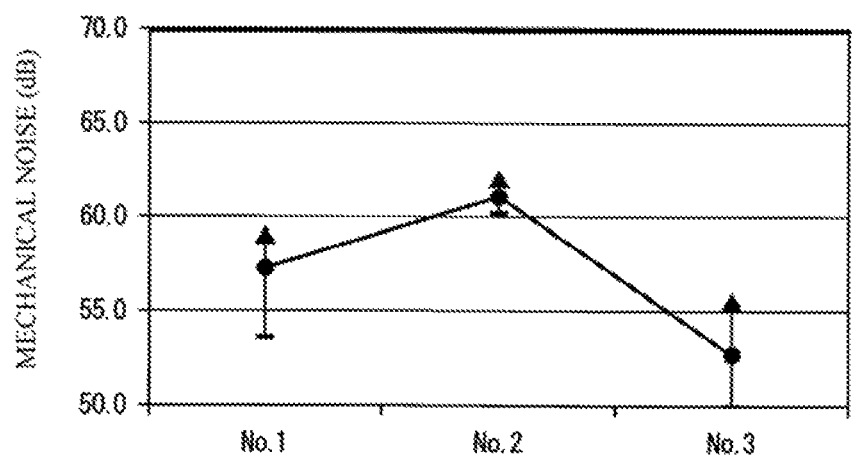
FIG. 5 is a diagram showing changes in mechanical noise due to a sample when an amplitude of primary vibration of a rotor is 15 μm.
Figure 6:
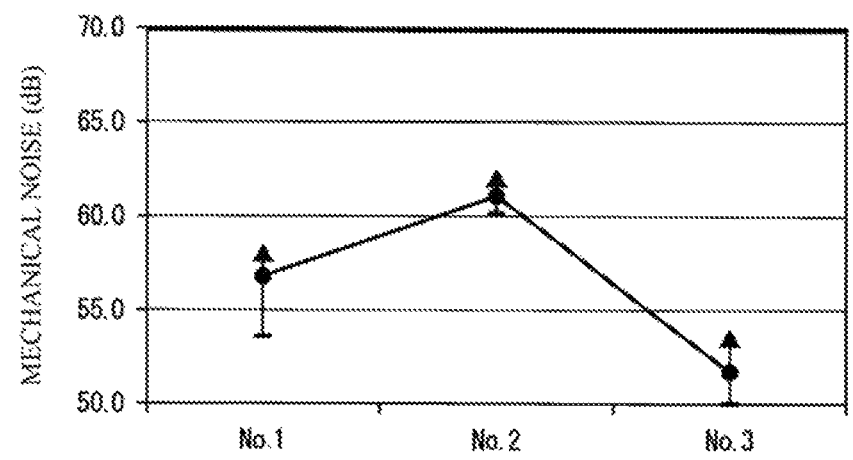
FIG. 6 is a diagram showing changes in mechanical noise due to a sample when an amplitude of primary vibration of a rotor is 10 μm.

Table 1 and FIG. 5 show the results of measurement when the amplitude of the primary vibration of the rotors is about 15 μm. In FIG. 5 and FIG. 6 to be described later, average values are shown by a symbol •, and maximum values and minimum values are shown by an error bar.

TABLE 1

| | Types of sample prototype | | |
|---|---|---|---|
| | No. 1 | No. 2 | No. 3 |
| Presence of rib | No | No | Yes |
| Material | PA66 resin | PBT resin | PBT resin |
| Maximum value | 59.0 | 62.0 | 55.5 |
| Minimum value | 53.5 | 60.2 | 50.0 |
| Average value | 57.2 | 61.1 | 52.6 |

The sample prototype type No. 1 had a maximum value of 59.0 dB, a minimum value of 53.5 dB, and an average value of 57.2 dB. The sample prototype type No. 2 had a maximum value of 62.0 dB, a minimum value of 60.2 dB, and an average value of 61.1 dB. In addition, the sample prototype type No. 3 had a maximum value of 55.5 dB, a minimum value of 50.0 dB, and an average value of 52.6 dB.

In the motor of sample prototype type No. 2, since the brush holder became harder than the motor of the sample prototype type No. 1, the average value of the mechanical noise was increased by 3.9 dB. However, in the motor of sample prototype type No. 3, since a rib was provided on the brush holder compared with the motor of the sample prototype type No. 2, the average value of the mechanical noise was decreased by 8.5 dB. In the motor of the sample prototype type No. 3, the average value of the mechanical noise was found to be decreased by 4.6 dB compared with the motor of sample prototype type No. 1.

Next, Table 2 and FIG. 6 show the results of measurement when the amplitude of the primary vibration of the rotors is about 10 μm.

TABLE 2

| | Types of sample prototype | | |
|---|---|---|---|
| | No. 1 | No. 2 | No. 3 |
| Presence of rib | No | No | Yes |
| Material | PA66 resin | PBT resin | PBT resin |
| Maximum value | 58.0 | 62.0 | 53.5 |
| Minimum value | 53.5 | 60.2 | 50.0 |
| Average value | 56.8 | 61.1 | 51.7 |

The sample prototype type No. 1 had a maximum value of 58.0 dB, a minimum value of 53.5 dB, and an average value of 56.8 dB. The sample prototype type No. 2 had a maximum value of 62.0 dB, a minimum value of 60.2 dB, and an average value of 61.1 dB. In addition, the sample prototype type No. 3 had a maximum value of 53.5 dB, a minimum value of 50.0 dB, and an average value of 51.7 dB.

In the motor of sample prototype type No. 2, since the brush holder became harder than the motor of the sample prototype type No. 1, the average value of the mechanical noise was increased by 4.3 dB. However, in the motor of sample prototype type No. 3, since a rib was provided on the brush holder compared with the motor of the sample prototype type No. 2, the average value of the mechanical noise was decreased by 9.4 dB. In the motor of the sample prototype type No. 3, the average value of the mechanical noise was found to be decreased by 5.1 dB compared with the motor of sample prototype type No. 1.

What is claimed is:
1. A motor comprising:
 a case; and
 a partition that is fitted into the case and has an easily deformable part formed on an outer peripheral surface for dispersing and dissipating vibration transmitted between the case and the partition, wherein a space is formed in the easily deformable part, the easily deformable part has a plurality of support pieces that protrude from the outer peripheral surface of the partition toward an outside of the case in a radial direction, the plurality of support pieces is disposed alternatively with the space in a circumferential direction of the case, and the length in the circumferential direction in which each of the support pieces comes into contact with the inner peripheral surface of the case is 1 to 50 times an actual amplitude in a natural frequency of the case.

2. The motor according to claim 1, wherein when a length in the circumferential direction in which each of the support pieces comes into contact with an inner peripheral surface of the case is a contact length and when a length in the circumferential direction between the plurality of support pieces adjacent to each other in the circumferential direction along the inner peripheral surface of the case is a non-contact length, a value obtained by dividing the contact length by a sum of the contact length and the non-contact length is 0.4 to 0.6.

3. The motor according to claim 2, wherein a ratio of the length in the circumferential direction between the plurality of support pieces adjacent in the circumferential direction along the inner peripheral surface of the case with respect to a distance in the radial direction from the inner peripheral surface of the case to a bottom of the space is 1 to 2.

4. The motor according to claim 2, wherein a total ratio of length in the circumferential direction in which each of the support pieces comes into contact with the inner peripheral surface of the case with respect to a full length in the circumferential direction of the inner peripheral surface of the case is 0.1 to 0.6.

5. The motor according to claim 2, wherein a ratio of a full length in the circumferential direction of the case in which the easily deformable part is disposed with respect to the full length in the circumferential direction of the inner peripheral surface of the case is 0.25 or more.

6. The motor according to claim 2, wherein the easily deformable part includes:

a dispersion dissipation damping part that disperses the vibration and dissipates the dispersed vibration; and a material damping part that dissipates the vibration by friction between molecules when the easily deformable part is deformed.

7. The motor according to claim 1, wherein a ratio of the length in the circumferential direction between the plurality of support pieces adjacent in the circumferential direction along the inner peripheral surface of the case with respect to a distance in the radial direction from the inner peripheral surface of the case to a bottom of the space is 1 to 2.

8. The motor according to claim 7, wherein a total ratio of length in the circumferential direction in which each of the support pieces comes into contact with the inner peripheral surface of the case with respect to a full length in the circumferential direction of the inner peripheral surface of the case is 0.1 to 0.6.

9. The motor according to claim 1, wherein a total ratio of length in the circumferential direction in which each of the support pieces comes into contact with the inner peripheral surface of the case with respect to a full length in the circumferential direction of the inner peripheral surface of the case is 0.1 to 0.6.

10. The motor according to claim 1, wherein a ratio of a full length in the circumferential direction of the case in which the easily deformable part is disposed with respect to the full length in the circumferential direction of the inner peripheral surface of the case is 0.25 or more.

11. The motor according to claim 1, wherein the easily deformable part includes:

a dispersion dissipation damping part that disperses the vibration and dissipates the dispersed vibration; and a material damping part that dissipates the vibration by friction between molecules when the easily deformable part is deformed.

12. The motor according to claim 1, wherein the easily deformable part includes:

a dispersion dissipation damping part that disperses the vibration and dissipates the dispersed vibration; and a material damping part that dissipates the vibration by friction between molecules when the easily deformable part is deformed.

13. A motor comprising:

a case; and a partition is fitted into the case and has an easily deormable part formed on an outer peripheral surface for dispersing and dissipating vibration transmitted between the case and the partition, wherein a space is formed in the easily deformable part, the easily deformable part has a plurality of support pieces that protrude from the outer peripheral surface of the partition toward an outside of the case in a radial direction, the plurality of support pieces is disposed alternatively with the space in a circumferential direction of the case, when a length in the circumferential direction in which each of the support pieces comes into contact with an inner peripheral surface of the case is a contact length and when a length in the circumferential direction between the plurality of support pieces adjacent to each other in the circumferential direction along the inner peripheral surface of the case is a non-contact length, a value obtained by dividing the contact length by a sum of the contact length and the non-contact legnth is 0.4 to 0.6, and the length length in the circumferential direction in which each of the support pieces comes into contact with the inner peripheral surface of the case is 1 to 50 times an actual amplitude in a natural frequency of the case.

\* \* \* \* \*